United States Patent [19]

Belanger et al.

[11] Patent Number: 4,848,670
[45] Date of Patent: Jul. 18, 1989

[54] NOZZLE CONSTRUCTION

[75] Inventors: James A. Belanger; Robert J. Wentworth, both of Northville; Barry S. Turner, Livonia; Graham J. Astley, Novi, all of Mich.

[73] Assignee: Belanger, Inc., Northville, Mich.

[21] Appl. No.: 236,309

[22] Filed: Aug. 24, 1988

Related U.S. Application Data

[63] Continuation of Ser. No. 54,631, May 27, 1987, abandoned.

[51] Int. Cl.$^4$ .......................... B05B 1/14; F26B 19/00
[52] U.S. Cl. .................................. 239/553; 239/566; 239/568; 15/312 R; 34/243 C
[58] Field of Search ............... 239/553, 554, 566, 568; 34/229, 243 C; 15/312 R, 405, 415 R; 285/253; 403/267, 269, 406.1

[56] References Cited

U.S. PATENT DOCUMENTS

| | | | |
|---|---|---|---|
| 157,256 | 11/1874 | Wiard | 239/553 |
| 1,956,107 | 4/1934 | Suchter | 285/253 |
| 2,193,306 | 3/1940 | Tinnerman | 403/406.1 |
| 2,261,500 | 11/1941 | Lewis et al. | 239/DIG. 19 |
| 3,263,341 | 8/1966 | Allen | 34/229 |
| 3,309,123 | 3/1967 | Edwards | 403/269 |
| 3,599,430 | 8/1971 | Kromrey | 239/DIG. 19 |
| 3,645,282 | 2/1972 | Kurronen | 134/172 |
| 3,877,107 | 4/1975 | Cirino | 15/312 R |
| 3,994,041 | 11/1976 | Barber | 15/312 R |
| 4,622,714 | 11/1986 | Tomasello | 15/405 |

Primary Examiner—Andres Kashnikow
Assistant Examiner—Karen B. Merritt
Attorney, Agent, or Firm—Dykema Gossett

[57] ABSTRACT

An air nozzle for blowing water off a vehicle moving through a car wash comprises a unit nozzle housing of molded plastic material having opposed front and rear walls and a side wall, with the front and rear walls terminating in opposed concave converging sides defining a lateral nozzle having a series of elongated throated orifices. The walls and sides define an elongated air chamber communicating with the orifices. An air inlet at one end of the housing is a part thereof and is adapted to receive a flexible hose connected to a pressurized air source. The front and rear walls have molded therein spaced mount plates or pads adapted for connection to a support arm and to a sensor respectively. A plurality of spaced threaded insert fasteners are molded, interlocked and enclosed selectively within one of the front and rear walls and the corresponding mount pads. The method of making a unit nozzle housing of molded plastic material is also disclosed.

22 Claims, 2 Drawing Sheets

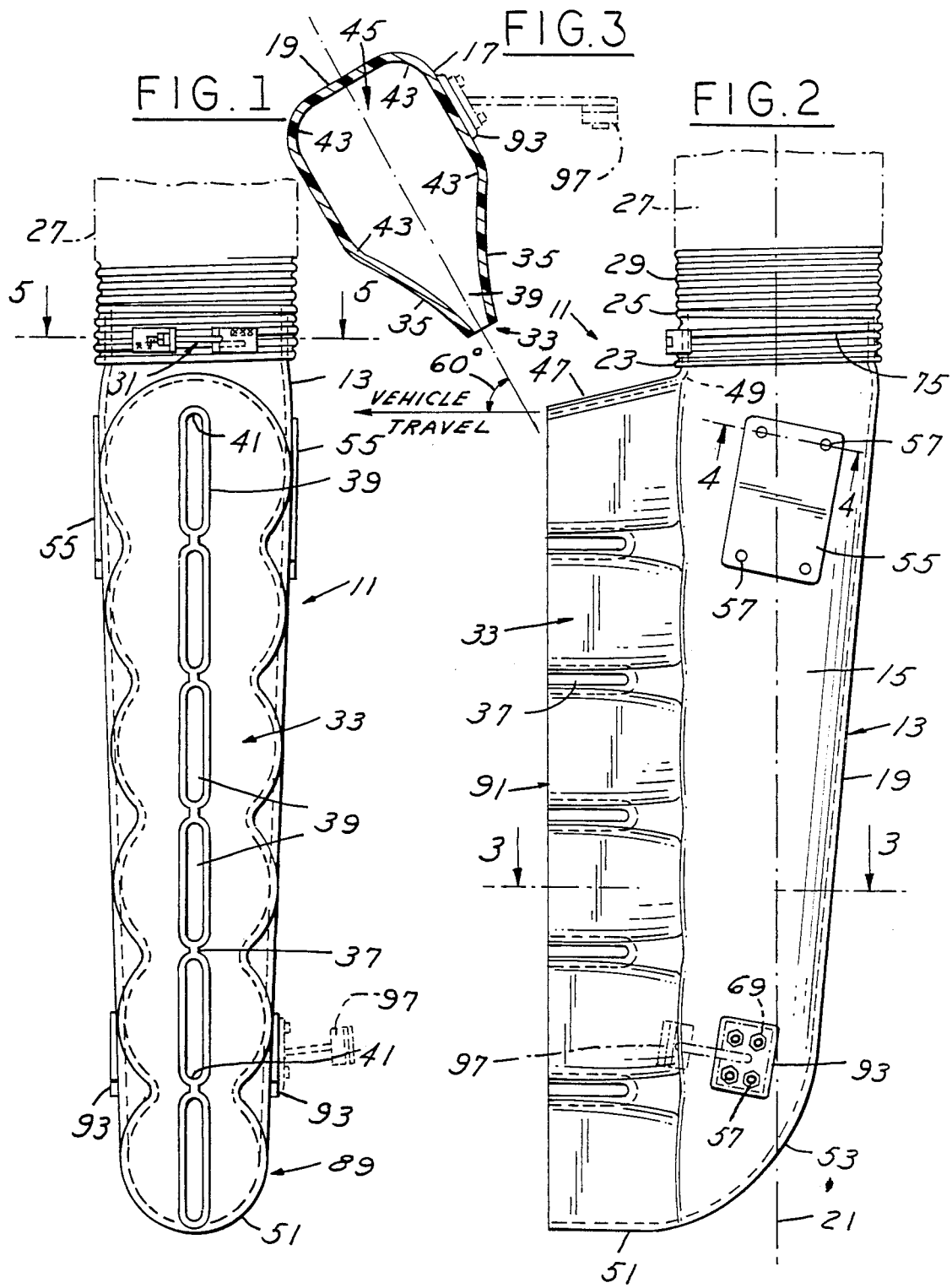

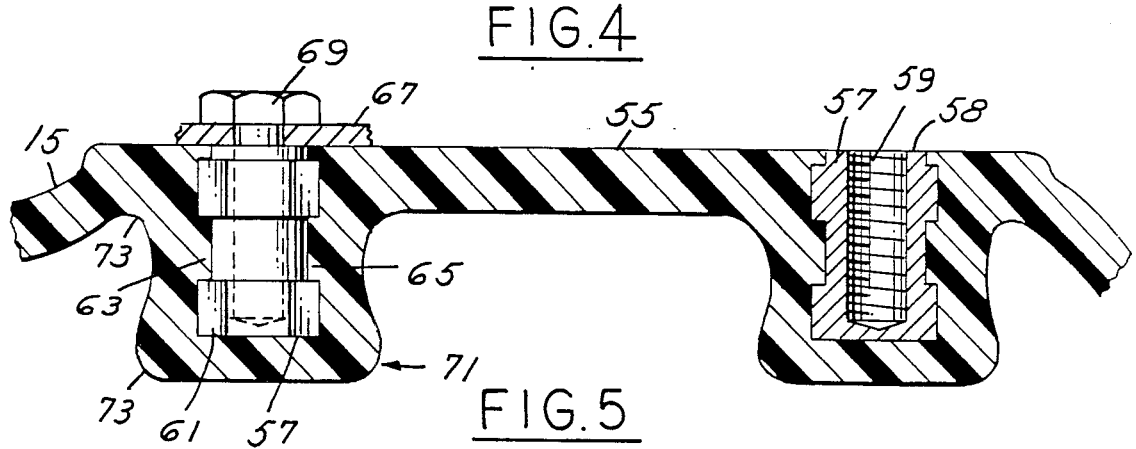
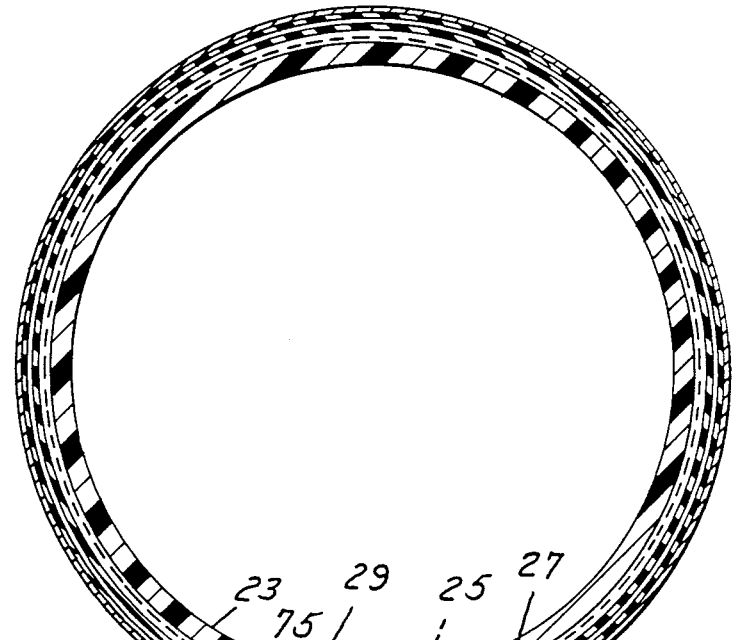
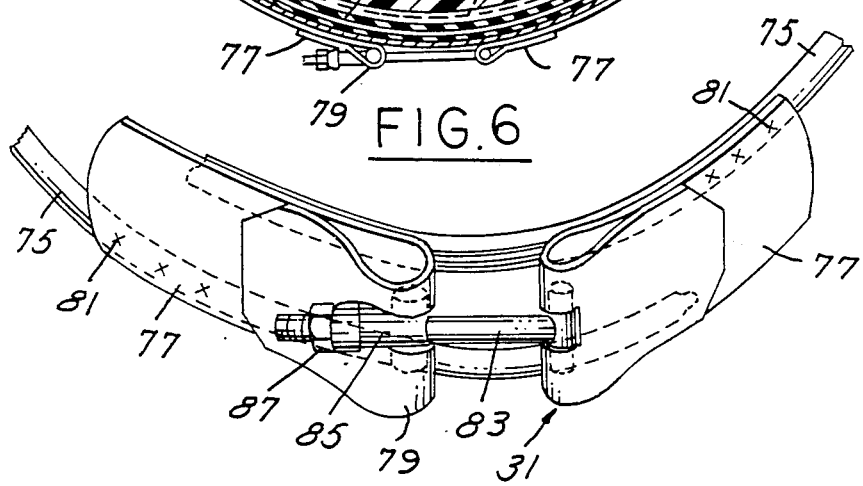

NOZZLE CONSTRUCTION

This is a continuation of co-pending application Ser. No. 07/054,631 filed on 5/27/87, now abandoned.

FIELD OF THE INVENTION

The present invention relates to a nozzle construction or to an air nozzle assembly and more particularly to a unit nozzle housing of molded plastic material having an air chamber upon one side terminating in an elongated lateral nozzle having a series of elongated aligned throated orifices and at one end an inlet adapted to receive a pressurized air hose.

BACKGROUND OF THE INVENTION

Previously air nozzles of the type adapted for blowing water off the sides of a vehicle moving through a car wash having an inlet and a laterally directed nozzle have been formed of metal. Attached to the housing was a separate inlet fitting connectable to a pressure air hose. Due to interrupted wall interiors, interior constructions including fasteners, the flow of air under pressure through the lateral nozzle has been turbulent, noisy and inefficient.

There have been difficulties in securing and retaining a flexible air hose over the inlet of the nozzle housing. There have been further difficulties in mounting an inlet upon and around an opening in the air nozzle housing and in efficiently securing the air inlet in position thereon.

Problems have also been encountered in adjustably supporting a pair of laterally spaced air nozzles on a frame work transverse of the path of movement of a washed vehicle moving therebetween. There have been difficulties in adjusting the angle of attack of the lateral nozzles for the efficient blowing of water off of the washed vehicle. Previously lateral air nozzle housings have been fixed for a wide vehicle and not for narrower vehicles, thereby not effectively drying the narrower or smaller vehicles.

SUMMARY OF THE INVENTION

An important feature of the present invention is to provide an air nozzle assembly adapted for blowing water off the side of a washed moving vehicle in a car wash, with the nozzle assembly comprising a unit housing of molded plastic material normally arranged in an upright position and having opposed front and rear walls and a side wall and with the front and rear walls terminating in opposed concave converging sides defining a lateral nozzle having a series of elongated aligned throated orifices.

As another feature corresponding front and rear walls and side wall and sides define an elongated air chamber communicating with the orifices in the laterally directed nozzle which extends along the height of the housing.

Still another feature is to provide for the unit nozzle housing an elongated air inlet at one end thereof arranged upon a first axis extending along the length of the housing and adapted to receive a flexible hose attached to a pressurized air source.

A further feature is to provide a unit nozzle housing of a high molecular weight polyethylene material.

A still further feature is to provide a lateral nozzle having an outer edge parallel to the first longitudinal axis of the housing with the orifices extending at right angles to the axis.

Another feature is to provide a side nozzle unit molded plastic housing wherein the air chamber converges inwardly from the air inlet and throughout its length and is in communication with the laterally directed orifices forming a part of the lateral nozzle.

Still another feature includes a series of parallel spaced transverse ribs extending between and interconnecting the converging concave sides as the molded plastic housing and defining the orifices, with the orifices being arranged in a row and aligned.

Another feature is to provide upon and adjacent one end of the air inlet an annular bead to provide a cooperative interlock with a corrugated flexible hose fitted over the inlet to prevent relative longitudinal movements therebetween, together with an adjustable clamp means which extends around and compressively engages the hose and inlet.

It is still another feature to provide upon each of the respective front and rear walls longitudinally spaced raised mount plates and wherein in the molding of the unit plastic housing a plurality of spaced threaded insert fasteners are arranged in the mold and molded, interlocked and nonrotatively enclosed selectively within the mount plates of the front and rear wall and adjacent wall adapted for a securing connection to a support arm upon a frame work for mounting the nozzle housing in an upright position, with the other mount plate being adapted for supporting a sensor.

A further feature is to provide within the housing and within the corresponding front and rear walls selectively and the spaced mount plates or pads thereon insert fasteners which are rotationally molded, with the fasteners permanently embedded and enclosed within the mount plates of the front or rear wall and adjacent wall and anchored against relative longitudinal and rotational movements.

A still further feature is to provide an air nozzle assembly having an improved clamp means which extends around and compressively engages a hose over the inlet upon the housing for securing a hose thereover for delivery of pressurized air into the chamber within the nozzle housing and for delivery through the orifices in the housing nozzle.

Another feature is to provide in the adjacent wall of the pair of mount plates or pads smooth blending nonobstructive convex embossments which extend over and enclose the respective fasteners whereby there is a smooth flow of pressurized air without turbulence from the air chamber outwardly through the respective lateral orifices at a greatly reduced noise level.

Still another feature is to provide radiused corners between adjacent walls and sides with the wall portions defining the orifices being internally radiused with sharp corners eliminated within the air chamber for the maximum smooth nonobstructed nonturbulent substantially noiseless air flow through the orifices.

A further important feature of the present invention is the method of making an air nozzle housing of molded plastic material having a lateral nozzle with a series of elongated aligned throated orifices therein, an air inlet as a unit part of the housing with longitudinally spaced mount plates or pads and corresponding front and rear walls which comprises the steps of taking a mold which when closed has an internal cavity corresponding to the outer configuration of the unit nozzle housing, inserting powdered or granular plastic material in the cavity of the mold, closing the mold and thereafter heating and rotating the mold in an oven to thereby melt the plastic material and to fill the cavity to form the unit nozzle housing, and thereafter permitting the mold to cool to thereby solidify the unit nozzle housing.

Still another feature includes the step of inserting into the mold prior to its rotation a plurality of spaced insert fasteners whereby the fasteners are permanently embedded, enclosed within and anchored selectively within one of the front and rear walls and corresponding mount plates or pads.

These and other objects and features will be seen from the following specification and claims in conjunction with the appended drawings.

THE DRAWINGS

FIG. 1 is a front elevational view of the air nozzle with a portion of a pressurized air hose, fragmentarily shown, connected thereto.

FIG. 2 is a right side elevational view thereof.

FIG. 3 is a plan section taken in the direction of arrows 3—3 of FIG. 2.

FIG. 4 is a section taken in the direction of arrows 4—4 of FIG. 2, on an increased scale.

FIG. 5 is a plan section taken in the direction of arrows 5—5 of FIG. 1, on an increased scale.

FIG. 6 is a fragmentary perspective view of the clamp assembly for the flexible conduit shown in FIGS. 1 and 5.

It will be understood that the above drawings illustrate merely a preferred embodiment of the invention, and that other embodiments are contemplated within the scope of the claims hereafter set forth.

DETAILED DESCRIPTION OF AN EMBODIMENT OF THE INVENTION

Referring to the drawings, the present nozzle construction or air nozzle assembly generally indicated at 11 in FIGS. 1 and 2, is normally employed in an upright position and adapted for use for directing pressurized air against one or the other opposite sides of a vehicle moving through a car wash. The present air nozzle assembly or nozzle construction 11 includes a unit nozzle housing 13 rotationally molded from plastic material, such as a high molecular weight polyethylene for illustration, though other plastic materials may be employed. The present unit nozzle housing 13 is of general transverse U-shape in cross-section, FIG. 3, and includes front wall 15 and spaced therefrom rear wall 17 and the connecting side wall 19. The unit molded nozzle housing 13 is arranged substantially along a first longitudinal axis 21, FIG. 2, and includes at one end a formed end unit inlet 23 upon axis 21 having adjacent one end an annular bead 25.

Inlet 23 is adapted to have positioned thereover the flexible hose 27 made from urethane or other suitable plastic material, having a series of corrugations 29 which are wire reinforced and adapted for interlock with the inlet bead 25 to prevent relative longitudinal movement between the hose 27 and inlet 23. Flexible hose 27, fragmentarily shown, is adapted for connection to a pressurized air source for delivery of pressurized air into air chamber 45, FIG. 3.

The clamp assembly 31, FIGS. 1 and 6, sometimes referred to as clamp means, surrounds a portion of corrugated flexible hose 27 and the adjacent inlet 23 for immovably securing the hose thereover.

The front and rear walls 15 and 17 opposite from side wall 19 terminate in the opposed concave converging sides 35 to define the lateral nozzle 33, FIGS. 1, 2 and 3. Intermediate the corresponding concave converging sides 35 are a series of unit molded transverse ribs 37, FIGS. 1 and 2. The ribs 37 extend between sides 35 forming an integral part thereof defining therewith the series of aligned laterally extending orifices 39 which are arranged in a row, FIG. 1. The individual orifices 39 have opposed rounded end surfaces 41 which smoothly blend with the corresponding interior radiused curved surfaces 43 upon the interior of the unit molded housing 13 adjacent the respective walls 15, 17 and 19, FIG. 3. The walls define elongated air chamber 45 in communication with the series of laterally extending orifices 39 which form the present laterally extending nozzle 33.

The nozzle 33, FIG. 2, has a downwardly inclined top wall 47 and a radiused corner 49 smoothly merging with inlet 23 as a unit part of nozzle housing 13. Lateral nozzle 33 has a transverse bottom wall 51 which extends at right angles to first axis 21. Side wall 19, FIGS. 2 and 3, top to bottom converges towards axis 21 and includes towards one end the curved side wall portion 53 which smoothly merges with transverse bottom wall 51 defining a corresponding interior shape for air chamber 45, which is of decreasing cross sectional shape from top to bottom, FIG. 2.

The corresponding radiused corners 43 and 49 including the concave converging sides 35 provides smooth air flow surfaces for the passage of pressurized air from inlet 23 along the interior of air chamber 45 and directly through the converging throated orifices 39 forming a part of lateral nozzle 33.

As shown in FIGS. 1 and 2 a pair of longitudinally spaced unit molded raised mount plates or pads 55 and 93 form a part of each of the front and rear walls 15 and 17. Interiorly threaded insert fasteners 57, as shown in detail in FIG. 4 on an increased scale, are rotationally molded within molded housing 13 and within adjacent portions of the corresponding mount plates 55 and 93 upon one or in some cases both sides of the housing 13 including front wall 15 and rear wall 17.

In the illustrative embodiment, the unit nozzle housing 13, FIG. 2, is adapted for mounting upon the passenger side of a frame work through which a vehicle travels during washing and wherein air nozzle 33 through its orifices 39 directs pressurized air to side portions of the vehicle throughout its height as the vehicle moves therethrough. Insert fasteners 57 have a threaded bore 59 and are flush mounted within the respective plates 55 and 93 and are a polygonal shape as at 61, FIG. 4. Each of the respective fasteners has an annular recess 63 intermediate its ends to provide a plastic interlock at 65 with respect to portions of the unit molded nozzle housing 13 and particularly the selected front or rear wall or both walls 15 and 17. In the illustrative embodiment, the insert fasteners 57 are molded within front wall 15 and within the adjacent raised integral mount plates or pads 55 and 93 and are interlocked within the housing 13 against relative longitudinal and rotational movements.

Referring to FIG. 2, the top mount plate 55 is adapted for registry with one end of an arm support which may be a swingable arm support as fragmentarily shown at 67, FIG. 4, connected to some portion of a frame work forming a port of a car wash assembly. The air nozzle assembly 11 and particularly the unit molded housing 13 is supported in the upright position shown in FIG. 2.

Though not shown in the drawings, it is contemplated that the support arm 67 fragmentarily shown, may be pivotally connected to the frame work upon a vertical axis such that there may be some limited pivotal adjustment of housing 13 about axis 21 for determining the preferred angle of attack of the jets of pressurized air through orifices 39 against and relative to the vehicle passing through a car wash and throughout its height.

In the illustrative embodiment, the preferred angle of attack is approximately 30°, for illustration, with respect to a normal line extending toward the moving vehicle. The range for the angle of attack is between 15° and 30°, approximately.

The arm support 67, fragmentarily shown, is connected to the unit nozzle housing 13 by a plurality of fasteners 69, FIG. 4. Corresponding to the respective insert fasteners 57 molded within the front or rear walls 15 and 17 selectively, or both walls, there are corresponding cup shaped convex embossments 71 which surround interior portions of the respective fasteners 57. Such fasteners are connected to interior surface portions of the corresponding walls as smooth continuations thereof so as not to be obstructive to the flow of pressurized air through air chamber 45. The embossments 71 include the radiused curves 73 in FIG. 4 from a smooth juncture with adjacent wall portions of the corresponding front and rear walls.

Clamp assembly 31, FIGS. 1 and 5, is shown on an enlarged scale in FIG. 6 and includes an elongated flexible metal channel 75 which extends around the corrugated hose 27, fragmentarily shown, over adjacent corrugations 29 and includes a pair of laterally overlapped ends. A pair of aligned laterally spaced anchor straps 77 overlie adjacent ends of channel 75 and corresponding adjacent intermediate portions of the channel 75 and are secured to the intermediate portions by welds 81. Each of the straps 77 include looped ends 79 adapted to receive T-bolt 83 and T-sleeve 85 with the T-bolt projecting through the sleeve 85 and secured snugly by fastener 87. The fasteners draw up the anchor straps and intermediate portions of channel 75 for extending the overlap between the free-ends of the channel 75 and for tightly securing hose 27 over inlet 23, FIGS. 1, 2, 5 and 6. As shown in FIG. 1, nozzle housing 13 is laterally converging from top to bottom at 89. The upright nozzle edge 91, FIG. 2, is parallel to axis 21.

In a car wash, there are usually two air nozzle assemblies 11 mounted at the sides of the framework of the car wash. One nozzle is usually fixed mounted, while the other nozzle is adapted to automatically move towards and away from the vehicle to accommodate the width of the vehicle.

The air nozzle assembly 11, which is movably mounted, is provided with a sonar detector or sensor 97. The detector 97 is secured to the second mount pad 93 at 69. The sonar detector 97 transmits or directs a high frequency sonar signal towards the opposing side surface of the vehicle and detects the distance between the sonar transmitter and the vehicle surface. This is determined by the elapsed time between the sending of the signal or transmission and the receipt of a reflection or response from the vehicle. The detector 97 produces three conditions. One condition of the detector is to bring the nozzle assembly 11 inwardly towards the vehicle. A second condition of the detector 97 is to allow the nozzle assembly 11 to maintain a position relative to the vehicle. Finally, the third condition of the detector is to allow the nozzle assembly 11 to retract or to move away from the vehicle.

The present invention is further directed to the method of making an air nozzle assembly of the type which may be used for blowing water off a moving vehicle in a car wash and which comprises the following steps:

(a) taking a two piece mold which when closed has an internal cavity corresponding to the outer configuration of the unit nozzle housing;

(b) placing powdered or granular plastic in the cavity of the open mold in an amount sufficient to from the air nozzle housing;

(c) closing the mold and bolting it together;

(d) moving the closed mold into a heated oven while rotationally rotating the mold to melt the plastic and thereby fill the cavity with liquid plastic material to form the unit nozzle housing with the lateral nozzle at one side, a formed air inlet upon one end and mount plates upon its front and rear walls;

(e) removing the heated mold from the oven and permitting the mold to cool by air or water to solidify the air nozzle housing; and (f) removing the solidified air nozzle housing from the mold.

The method includes a further step of:

(g) inserting into the mold prior to its rotation a plurality of spaced insert fasteners 57 whereby the fasteners are permanently embedded, enclosed and interlocked selectively within the raised mount plates of one of the front and rear housing walls of the unit molded housing.

It is also contemplated as a part of the present method, initially when the molded air nozzle is removed from the mold the orifices 39 are closed. A further step includes cutting the nozzle along its upright edge 91 for opening the corresponding vertically aligned orifices 39.

In the illustrative embodiment, the preferred plastic material is a high molecular weight polyethylene. Any suitable plastic material may be employed which is tough in resistance to damage, impervious to temperature changes, inexpensive, impervious to chemicals including cleaning agents and easy to clean, and is durable and long-lasting. The present molded nozzle provides for consistent velocity at the ends of the corresponding orifices 39 providing a smooth uninterrupted flow of pressurized air at uniform velocity and substantially noiseless.

Having described our invention, reference should now be had to the following claims:

We claim:

1. An air nozzle comprising:
   a unit nozzle housing of molded plastic material having opposed front and rear walls and a side wall, said front and rear walls terminating in opposed concave converging sides defining a lateral nozzle having a series of elongated aligned orifices, said walls and sides defining an elongated air chamber communicating with said orifices;
   an elongated air inlet at one end of said housing as a part thereof arranged upon a first axis;
   a first set of raised mount pads, spaced laterally apart, upon said front and rear walls, and located adjacent said air inlet; and
   a plurality of spaced threaded insert fasteners molded, interlocked and non-rotatably enclosed selectively within one of said mount pads and adjacent wall, adapted for securing connection to a support arm upon a framework for mounting the nozzle housing in an upright position.

2. The air nozzle of claim 1, the molded plastic material of said nozzle housing being of high molecular weight polyethylene.

3. The air nozzle of claim 1, said front, rear and side walls and sides smoothly blending into said air inlet.

4. The air nozzle of claim 1, said air inlet being a longitudinal extension of said housing walls.

5. The air nozzle of claim 1, said lateral nozzle having an outer edge parallel to said first axis, with said orifices extending at right angles to said first axis.

6. The air nozzle of claim 1, said air chamber converging inwardly from said air inlet.

7. The air nozzle of claim 1, said lateral nozzle having a bottom edge extending at right angles to said first axis;
said side wall converging from said inlet towards said first axis and curved into and blending with said bottom edge.

8. The air nozzle of claim 1, including a series of parallel spaced transverse ribs extending between and interconnecting said converging concave sides as a molded part thereof defining said orifices, said orifices being arranged in a row.

9. The air nozzle of claim 1, including an annular bead upon and adjacent one end of said air inlet.

10. The air nozzle of claim 8, said ribs respectively defining the arcuate top and bottom surfaces of said orifices and merging with radiused surfaces with the interiors of said concave converging sides.

11. The air nozzle of claim 1, said nozzle housing having a wall thickness of 3/8", approximately.

12. The air nozzle of claim 1, said housing and insert fasteners being rotationally molded with said fasteners permanently embedded and enclosed within said mount pads and adjacent wall, and anchored against relative longitudinal and rotational movements.

13. The air nozzle of claim 1, said insert fasteners being polygonal in shape and having an annular groove intermediate their ends to receive plastic material to provide an interlock with said housing against relative longitudinal and rotative movements.

14. The air nozzle of claim 12, the adjacent wall of said mount pads having smooth blending nonobstructive convex embossments extending over and enclosing said fasteners.

15. The air nozzle of claim 1, the corners between adjacent walls and sides and wall portions defining the orifices being internally radiused, eliminating sharp corners within said air chamber for the maximum smooth nonobstructed, nonturbulent, substantially noiseless air flow through said orifices.

16. An air nozzle comprising:
a unit nozzle housing of molded plastic material having opposed front and rear walls and a side wall, said front and rear walls terminating in opposed concave converging sides defining a lateral nozzle having a series of elongated aligned throated normally closed orifices, said walls and sides defining an elongated air chamber communications with said orifices;
an elongated air inlet at one end of said housing as a part thereof arranged upon a first axis;
said lateral nozzle adapted to be cut along its length at its outer edge forming elongated openings through said orifices;
a pair of longitudinally spaced raised mount pads upon said front and rear walls; and
a plurality of spaced threaded insert fasteners molded, interlocked and nonrotatively enclosed selectively within mount pads of one of said front and rear walls and adjacent wall, one mount pad adapted for securing connection to a support arm upon a frame work for mounting the nozzle housing in an upright position, and the other mount pad adapted to have a sensor secured thereto.

17. An air nozzle comprising:
a unit nozzle housing of molded plastic material having opposed front and rear walls and a side wall, said front and rear walls terminating in opposed concave converging sides defining a lateral nozzle having a series of elongated aligned orifices, said walls and sides defining an elongated air chamber communicating with said orifices;
an elongated air inlet at one end of said housing as a part thereof arranged upon a first axis;
a first set of raised mount pads, spaced laterally apart, upon said front and rear walls, and located adjacent said air inlet;
a second set of raised mount pads, spaced laterally apart, upon said front and rear walls and located adjacent the other end of said housing; and
a plurality of spaced threaded insert fasteners molded, interlocked and non-rotatably enclosed selectively within one of said mount pads and adjacent wall of each of said sets, said one mount pad of the first set adapted for securing connection to a support arm upon a framework for mounting the nozzle housing in an upright position and said one mount pad of the second set adapted to have a sensor secured thereto.

18. The air nozzle of claim 17, wherein said adjacent wall for the mount pads of said first and second sets provided with said insert fasteners is said front wall.

19. The air nozzle of claim 17, wherein said adjacent wall for the mount pads of said first and second sets provided with said insert fasteners is said rear wall.

20. An air nozzle comprising:
a unit nozzle housing of plastic material having opposed front and rear walls and a side wall, said front and rear walls terminating in opposed concave converging sides defining a lateral nozzle having a series of elongated aligned orifices, said walls and sides defining an elongated air chamber communicating with said orifices;
an elongated air inlet at one end of said housing as a part thereof arranged upon a first axis;
said front, rear and side walls and sides smoothly blending into said air inlet forming a longitudinal extension of said housing walls;
said lateral nozzle having an outer edge parallel to said first axis, with said orifices extending at right angles to said axis;
said air chamber converging inwardly from said air inlet;
said lateral nozzle having a bottom edge extending at right angles to said first axis; and
said side wall converging from said inlet towards said first axis and curved into and blending with said bottom edge.

21. An air nozzle comprising:
a unit nozzle housing of molded plastic material having opposed front and rear walls and a side wall, said front and rear walls terminating in opposed concave converging sides defining a lateral nozzle having a series of elongated aligned orifices, said walls and sides defining an elongated air chamber communicating with said orifices;

an elongated air inlet at one end of said housing as a part thereof arranged upon a first axis;

a series of parallel spaced transverse ribs extending between and interconnecting said converging concave sides as a molded part thereof defining said orifices, said orifices being arranged in a row;

said ribs respectively defining the arcuate top and bottom surfaces of said orifices and merging with radiused surfaces with the interiors of said concave converging sides; and said lateral nozzle having an outer edge parallel to said first axis, with said orifices extending at right angles to said axis.

22. The method of making a unit nozzle housing of molded plastic material having a lateral nozzle having a series of elongated throated normally closed orifices and an air inlet at one end of the housing, and a mount pad upon its front and rear walls comprising the steps of:

taking a mold which when closed has an interior cavity corresponding to the outer configuration of the unit molded nozzle housing;

inserting into the mold a plurality of spaced insert fasteners;

placing powdered or granular plastic material in the cavity;

heating and rotating said mold to fill said cavity with liquid plastic material, and thereby form the unit nozzle housing and permanently embed, enclose within and anchor the insert fasteners selectively within one of the front and rear walls of the unit molded housing and corresponding mount pad;

cooling the mold and thereby solidifying the formed plastic unit nozzle housing;

removing the solid plastic unit nozzle housing from the mold; and cutting along the edge of the lateral nozzle thereby forming a row of elongated openings in said orifices.

* * * * *